United States Patent [19]

El-Menshawy et al.

[11] 4,348,573
[45] Sep. 7, 1982

[54] METHODS AND APPARATUS FOR ELECTRICAL DISCHARGE MACHINING

[75] Inventors: Mohamed F. El-Menshawy, Selly Oak; Peter A. Woodrow, Sevenoaks; Sushantha K. Bhattacharyya, Birmingham, all of England

[73] Assignee: National Research Development Corporation, London, England

[21] Appl. No.: 154,408

[22] PCT Filed: Dec. 8, 1978

[86] PCT No.: PCT/GB78/00052

§ 371 Date: Aug. 13, 1979

§ 102(e) Date: Aug. 6, 1979

[87] PCT Pub. No.: WO79/00380

PCT Pub. Date: Jun. 28, 1979

[51] Int. Cl.³ .............................................. B23P 1/08
[52] U.S. Cl. ............................. 219/69 M; 219/69 C
[58] Field of Search ................. 219/69 C, 69 P, 69 G, 219/69 M, 69 S, 130.01

[56] References Cited

U.S. PATENT DOCUMENTS

| Re. 27,707 | 7/1973 | Kauffman | 219/69 P |
|---|---|---|---|
| Re. 29,398 | 9/1977 | Inoue . | |
| 3,673,377 | 6/1972 | Jesnitzer et al. | 219/130.01 |
| 3,679,865 | 7/1972 | Jesnitzer et al. | 219/130.01 |
| 3,816,692 | 6/1974 | Ratmansky | 219/69 C |

FOREIGN PATENT DOCUMENTS

| 2252900 | 6/1975 | France . |
|---|---|---|
| 640188 | 7/1950 | United Kingdom . |
| 953441 | 3/1964 | United Kingdom . |
| 956211 | 4/1964 | United Kingdom . |
| 1139007 | 1/1969 | United Kingdom . |
| 1320136 | 6/1973 | United Kingdom . |
| 1460165 | 12/1976 | United Kingdom . |
| 1492027 | 11/1977 | United Kingdom . |

OTHER PUBLICATIONS

"Controlling Machines by Ear" by J. D. Krouse, Machine Design, Oct. 20, 1977, pp. 146-151.

Primary Examiner—C. C. Shaw
Attorney, Agent, or Firm—Cushman, Darby & Cushman

[57] ABSTRACT

A method and monitoring apparatus for use in electrical discharge machining (EDM) are described. The method and apparatus relate to the problem of distinguishing between arcing and sparking in EDM and employ sound (including ultrasonic signals) emitted from the gap between an electrode and a workpiece to generate signals which differentiate between the two conditions. In an embodiment disclosed the signals generated are used in an apparatus which indicates visually whether sparking or arcing is taking place and in other embodiments monitoring is used to control parameters of EDM machining.

23 Claims, 22 Drawing Figures

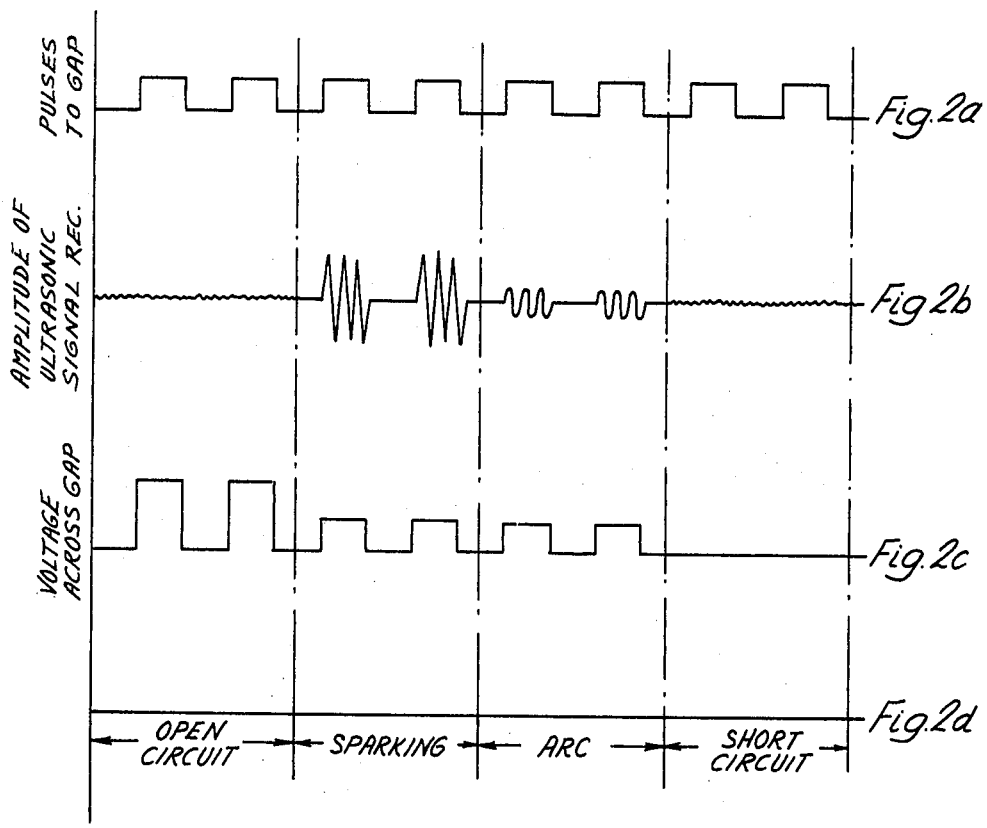

METHODS AND APPARATUS FOR ELECTRICAL DISCHARGE MACHINING

TECHNICAL FIELD

The present invention relates to apparatus and methods for monitoring electrical machines and controlling such machines in accordance with the monitoring carried out. It is particularly, but not exclusively, related to monitoring electrical discharge machining (E.D.M.) otherwise known as spark erosion machining, and controlling E.D.M. machines.

Background Art

Some of the problems which arise in E.D.M. include establishing optimum pulse length and mark space ratio of pulses applied between a workpiece and an electrode machining the workpiece. Such parameters depend on for example the material of the workpiece and the shape to be machined. Other parameters which require optimisation are the size of the gap between the electrode and the workpiece, the speed of feed of the electrode towards the workpiece during machining and pulse voltages and currents. All these parameters are interrelated so that the adjustment of one affects another and consequently the effectiveness and efficiency of machining. Some of these parameters are discussed in more detail below.

Between the condition when the electrode touches the workpiece and a short circuit is present, and the condition in which the gap is too wide for an electrical discharge to take place, there are many ways in which an E.D.M. machine can be set up and an E.D.M. process carried out. Many known E.D.M. machines monitor the voltage across the gap and/or the current flowing through the electrode and the workpiece in order to give an operator a visual indication of how machining is progressing so that he can make adjustments. Usually in addition the monitored voltage and/or current is used to carry out some automatic adjustment of some of the above mentioned parameters.

Objects of the present invention include more effective monitoring of the discharge between the workpiece and the electrode, the provision of means for measuring the efficiency of E.D.M., and the provision of improved E.D.M. methods and apparatus.

Disclosure of Invention

According to a first aspect of the invention there is provided apparatus for monitoring electrical discharge machining comprising a receiver for sound of the type hereinafter specified emitted from the vicinity of an electrode and/or a workpiece when the electrode is being used to machine the workpiece, the sound having a characteristic which differs in some way or ways between first and second electrical-discharge conditions, and indicator means for providing a monitor signal representative of the said characteristic from output signals from the receiver.

In E.D.M. machining the type of discharge required is sparking rather than arcing. An arc is to be avoided because although metal removal rate is high an arc tends to remain stationary so that instead of obtaining even machining, metal is removed from one portion of the workpiece only. A spark on the other hand occurs at rapidly changing random positions across the gap so that even (that is generally homogeneous) machining is achieved. A spark can be regarded as the electrical discharge which precedes an arc. When an arc is set up a discharge first occurs across a gap and this discharge causes the dielectric, whether gas or fluid, to be ionised so that in a very short period an ionisation channel is set up. When such a channel is set up the electrical resistance along the channel is low and a discharge continues to follow the channel. In this condition an arc has been established. In other words a spark is present when a light emitting discharge occurs between the electrode and the workpiece but relatively little ionisation has taken place, certainly not enough to establish a "permanent" ionisation channel, while an arc is present when an electrical discharge along a low resistance ionisation channel occurs.

Voltage pulses applied between the workpiece and an electrode during E.D.M. machining have been mentioned, and the inventors have discovered that the discharge between the electrode and the workpiece during a voltage pulse is made up of a plurality of separate sparks during good machining and that machining deteriorates when a voltage pulse includes a period of arcing. Previously, it was thought that each pulse started with a spark which gave way to an arc. The inventors' discovery allows a pulse, or the continuous application of a voltage between the electrode and the workpiece, to be interrupted following the occurrence of arcing as indicated by monitoring.

In this specification "sound" means the transmission of energy by the vibration of particles in a solid, liquid or gaseous medium. The term "sound" is used in this way simply for convenience even though the foregoing definition includes, in addition to sounds which can be heard by the human ear (acoustic energy), also pressure variations or particle vibrations at ultrasonic frequencies. In E.D.M. the first and second conditions are sparking and arcing, respectively.

Sound energy of the said type (indicating sparking) may for example be in the frequency range 1 KHz to 2 MHz since in this range the level of sound emitted during sparking is higher, usually much higher, than during arcing: while the preferred range for the reception of sound energy of the said type is 2 KHz to 70 KHz. Below about 0.4 KHz arcing has been found to generate sound levels which are higher than during sparking. Hence the said characteristic may for example be sound level or frequency.

An example of the sound spectrum occurring during arcing and sparking is given in FIG. 12. However it should be realised that the curves shown depend on many factors and may not be repeatable except in general form. This is particularly relevant to the curve shown for arcing since it is difficult to obtain a pure arcing condition.

The indicator means may provide an electrical signal, for example, or a visual signal in the form for instance of a pointer moving over a scale or in the form of a digital display.

Advantageously the receiver may comprise a transducer, such as a piezoelectric crystal, a microphone, a hydrophone, or vibration or pressure sensor, an amplifier having a bandwidth covering the range 2 KHz to 70 KHz and a detector coupled at the output of the amplifier. If it is required to know how effective machining currently is, the detector may be coupled to an indicating instrument. Alternatively, or in addition, the output signal from the detector may be used in controlling one of the parameters of an E.D.M. machine.

To form an efficiency meter the detector may be connected to an integrator coupled to a display, and to means for periodically resetting the integrator and the display after an adjustable interval.

According to a second aspect of the present invention there is provided machining apparatus for carrying out E.D.M. comprising monitoring apparatus according to the first aspect of the invention, a tank for dielectric fluid containing support means for supporting a workpiece, a holder for an electrode, supply means for applying a voltage between, and passing a current by way of, the said electrode and the said workpiece, means for controlling the relative positions of the said electrode and the said workpiece to allow E.D.M. to take place, and control means for adapting at least one parameter of the machining process carried out by the machining apparatus, in accordance with the monitoring signal obtained from the monitoring apparatus.

The supply means may comprise means for supplying voltage or current pulse, usually rectangular in waveform, to the gap between the said electrode and the said workpiece, the control means may then include means for adjusting, when the level of the monitor signal falls below a predetermined level, the duration of the pulses and/or the mark space ratio of the pulses in accordance with the monitoring signal, or for curtailing the generation of pulses.

The supply means may comprise at least one power switching device connected to be in series, in operation, with terminals for the connection of a direct current source, the said electrode and the said workpiece, and a pulse oscillator for applying pulses to trigger the power switching device into conduction periodically. The power switching device may for example comprise a plurality of parallel connected semiconductor controlled rectifiers (SCRs), such as thyristors, or semiconductor controlled switches (SCSs), or power transistors.

The control means may include a control switching device such as an SCR connected in series with the power switching device or devices, the said terminals and, in operation, the gap between the electrode and the workpiece, first means for periodically triggering the control switching device when the monitoring signal is above a predetermined level, and second means for triggering the control switching device at predetermined intervals when the monitor signal is below the predetermined level, the intervals between triggering by the second triggering means being sufficient for an ionisation channel in the gap to disperse.

The control means of the apparatus according to the second aspect of the invention for modifying an E.D.M. machine may instead comprise a gate adapted to be coupled between the pulse oscillator of the supply means and the power switching device or devices thereof, first means for enabling the gate when the monitor signal is above a predetermined level, and second means for enabling the gate at predetermined intervals, sufficient for an ionisation channel in the gap to disperse, when the monitoring signal is below the predetermined level.

In other forms of machining apparatus according to the second aspect of the invention the control means may include means for causing the supply means to apply a voltage between the electrode and the workpiece to allow a continuous discharge across the gap unless the monitoring signal is below a predetermined level when voltage pulses are periodically applied across the gap at predetermined intervals.

Instead or in addition the control means may change one of the following in accordance with the monitoring signals:

size of gap between electrode and workpiece, rate of feed of electrode towards workpiece (or vice versa), voltage and/or current across the gap, and initiation of scavenging the gap by pumping dielectric liquid through the gap and/or greatly increasing the size of the gap.

An E.D.M. machine of the type specified and apparatus according to the second aspect of the invention may include automatic scavenging means constructed to increase the gap between the electrode and the workpiece by a comparatively large amount if the monitor signal is below a predetermined level or continually falls below the predetermined level within a given interval.

According to a third aspect of the present invention there is provided a method for monitoring electrical discharge machining comprising receiving sound of the type hereinbefore specified emitted from an electrical discharge machine, the sound having a characteristic which varies in some way or ways between first and second electrical-discharge conditions, and deriving a monitoring signal representative of the said characteristic from the sound received.

In particular the method is useful where sound of the type hereinbefore specified emitted from the vicinity of the electrode and the workpiece is received and a monitoring signal is provided indicative of the level of this sound.

Adjustments, relating to a parameter of the machining process, may be automatically made in accordance with the monitoring signal obtained.

BRIEF DESCRIPTION OF DRAWINGS

Certain embodiments of the invention will now be described by way of example, with reference to the accompanying drawings, in which:

FIGS. 2a to 2f show waveforms occurring in an E.D.M. machine and in an amplifier coupled to a piezoelectric transducer in the vicinity of the machine.

A basic prior art E.D.M. system is first described to enable the invention to be appreciated.

Figure 1:
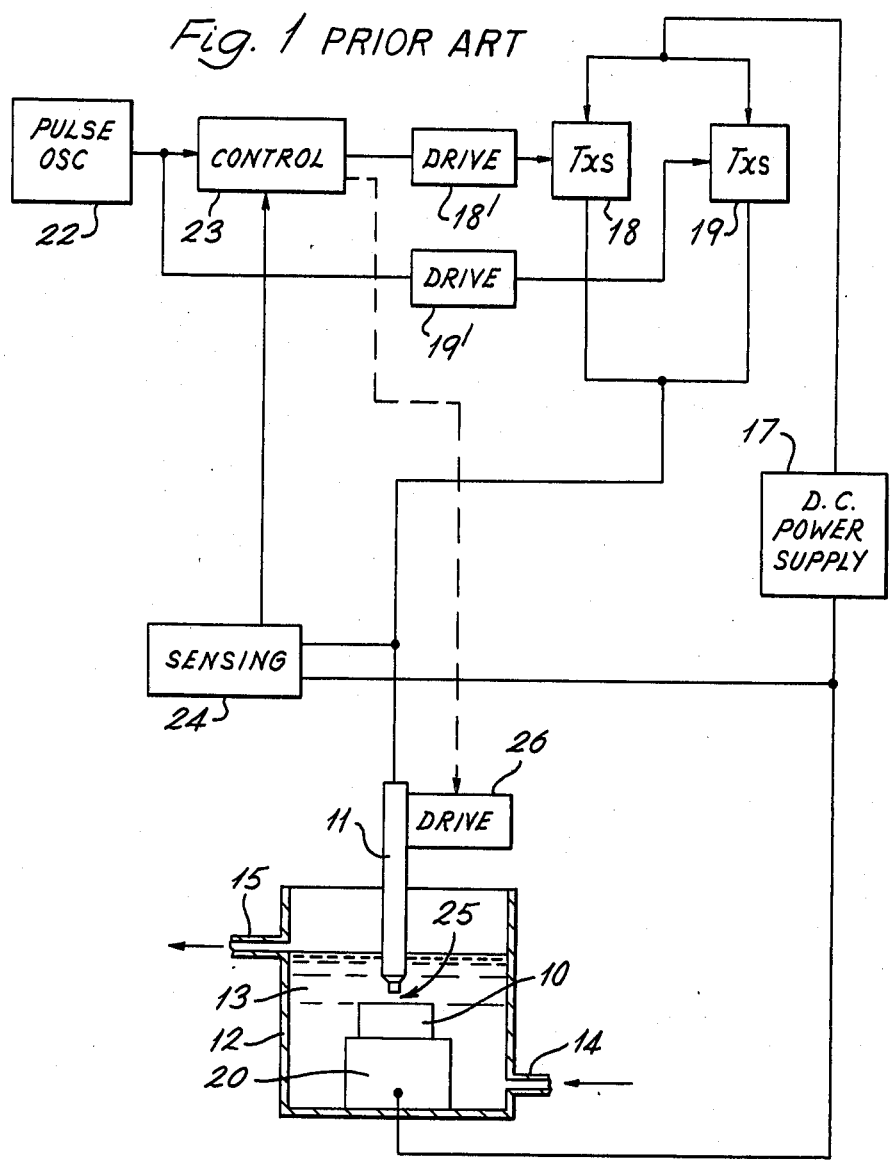
FIG. 1 is a part schematic part block diagram of a prior art E.D.M machine.

In FIG. 1 a workpiece 10 is eroded by sparks and arcs between an electrode 11 and the workpiece itself. A tank 12 contains a dielectric liquid 13 in which the workpiece and one end of the electrode are immersed. The dielectric liquid which may be paraffin is pumped into an inlet 14 and recirculated after passing out of an outlet 15.

The sparks and arcs are generated by an electrical circuit comprising a d.c. power supply 17, typically of 85 volts coupled by way of parallel-connected groups 18 and 19 of transistors to the electrode 11, the workpiece 10 being connected by way of a support 20 to one terminal of the power supply 17.

A pulse oscillator 22 supplies triggering pulses for the transistor groups 18 and 19 by way of drive circuits 18' and 19' but whereas these triggering pulses are continually supplied to the group 19 the supply of such pulses to the group 18 is dependent on a signal from a control circuit 23. If in operation one of the following three conditions occurs: a gap 25 between the workpiece 10 and the electrode 11 closes completely so that a short circuit occurs; or closure of the gap 25 is imminent; or permanent arcing across the gap occurs, then the resulting voltage drop or current increase through the gap is sensed by a circuit 24 which by operating on the control circuit 23 inhibits triggering pulses reaching the transistor group 18. At other times the group 18 conducts and machining takes place. A typical machine includes a control for selecting the number of transistors in each group but for example the group 18 usually contains 80% of the total number of power transistors in use at any one time while the remaining 20% is in the group 19. Thus when any one of the above mentioned three conditions occurs 80% of the power supplied to the gap 25 will be removed.

A machine operator may have the following controls: the duration of pulses from the oscillator 22, the mark space ratio of these pulses and the speed of feed of the electrode 11 towards the workpiece 10, this speed being controlled by a mechanical servo system labelled drive and designated 26 in FIG. 1. The operator usually also has control of a number of transistors to be used at any time in addition to their grouping to allow the current to the gap to be varied, the transistors being connected in circuits which ensure that each transistor passes a known current.

For any particular type of machining, for example workpiece materials and shape of workpiece, to be carried out the operator sets up his controls according to instructions laid down in the manufacturer's manual of the E.D.M. machine being used. In addition the operator has a monitoring meter indicating voltage across the gap 25 or current therethrough.

In E.D.M. machining the optimum conditions are, as has been explained, those which cause sparking (not arcing) across the gap for the maximum possible fraction of machining time. In the prior art machine of FIG. 1 when machining is started the drive 26 drives the electrode 11 towards the workpiece 10 until the two are in contact when the drive moves the electrode 11 a short distance, about twenty microns from the workpiece and sparking commences and should continue provided the pulse length, mark space ratio and speed of drive of the electrode 11 are correct. However the process is rather uncertain and at times arcs develop across the gap perhaps due to swarf machined from the workpiece or the gap closes completely or opens too far. If an arc develops the sensing circuit 24 cuts off, for example, 80% of the power to the gap as already described for an interval and then restores power. If an arc re-occurs immediately and the process of removing 80% of the power from the gap is again unsuccessful in preventing an arc restriking, the control circuit 23 causes the drive 26 to open the gap 25 greatly and the paraffin flowing through the tank flushes away any debris in the gap. A flushing tube (not shown) directed at the gap is usually provided, and when the gap is opened up a solenoid valve (not shown) is operated and a jet of paraffin flushes the debris away from the workpiece. Should these measures be unsuccessful the operator will reset the machine by, for example, reducing the drive speed of the workpiece, or reducing the pulse length, or reducing the mark space ratio.

Much machining time is wasted and many of these operations are only necessary because up to the present there has been no satisfactory way of monitoring events in the gap 25.

A typical E.D.M. machine with controls of the above type is a Sparcatron Generator SPF 60W which has a gap voltage of 85 volts and a typical gap current during machining of 60 amps. The duration of each oscillator pulse can be set between 2 μsec and 2 msec and the mark space ratio can be set over the range in which the duration of the spaces is 0.2 to 4 times that of the marks.

The present inventors have discovered that sound energy radiated from the region of the gap between the electrode and the workpiece is significantly different when the following four conditions: open circuit, sparking, arc and short circuit exist in the gap between the electrode and the workpiece.

As far as the sound energy from the gap is concerned, when sparking occurs it is accompanied by comparatively high level sound radiation at frequencies between 1 KHz and 2 MHz especially in the range 2 KHz to 70 KHz. During arcing, however, only relatively low level sound energy radiation takes place except at frequencies about 0.4 KHz and below.

The specific embodiments of the invention which follow describe apparatus making use of sound signals in the 2 KHz to 70 KHz range but other frequencies may alternatively be employed by appropriate redesign of the transducers and circuits.

Various conditions of ultrasonic radiation are illustrated in FIGS. 2a to 2f. FIG. 2a shows an arbitrary, approximately 1:1 mark space ratio of voltage pulses applied across the gap between the electrode and the workpiece. An arbitrary pulse length of 2 milliseconds is shown.

In FIG. 2d the four conditions mentioned above have been indicated and FIG. 2b shows the sound signal amplitude occurring under these conditions. FIG. 2 has been greatly simplified to remove the noise and other transients which occur in practical waveforms and also to select one sound frequency which occurs during arcing and one which occurs during sparking. As can be seen during the open circuit and short circuit conditions there is practically no sound radiation at all. That which is shown is due, for example, to background noise and vibration. During the sparking condition a high amplitude high frequency sound signal occurs in the dielectric liquid whereas during the arcing condition only a relatively low frequency low amplitude sound signal is generated. The ratio of amplitudes and frequencies between the sound signals for sparking and arcing have been reduced in order to simplify the figure. In FIG. 2c the voltage across the gap is shown and it can be seen that whereas practically the full voltage occurs during open circuit and practically no voltage occurs during a short circuit, relatively small voltages appear during sparking and arcing but the difference in magnitude of these voltages is rather small and on the whole insufficient for detecting satisfactory machining occurring during sparking and unsatisfactory machining occurring during arcing.

More typical but still simplified waveforms which might be obtained during machining are shown in FIG. 2e, where the sound signals can be seen to change character at times from the high amplitude high frequency characteristic of sparking to the lower frequency low amplitude characteristic of arcing. In the first sound pulse the change from sparking to arcing can be observed from the waveform and ideally a discharge would be stopped as soon as arcing started as is achieved in some embodiment of the invention. FIG. 2f shows high amplitude high frequency sound signals during all machining pulses and this constitutes a good machining situation.

Figure 3A:
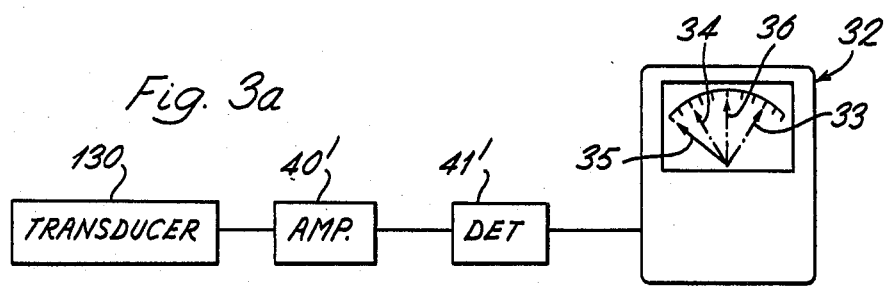
FIG. 3a is a block circuit diagram of E.D.M. monitoring apparatus according to the invention.

One aid to improved E.D.M. machining which is provided by the invention is a monitor which indicates clearly which of the four above mentioned conditions is currently occurring. In FIG. 3a an ultrasonic transducer 130 is coupled by way of an amplifier 40' and a detector circuit 41' to a milliammeter or millivoltmeter indicated schematically at 32.

Figure 3B:
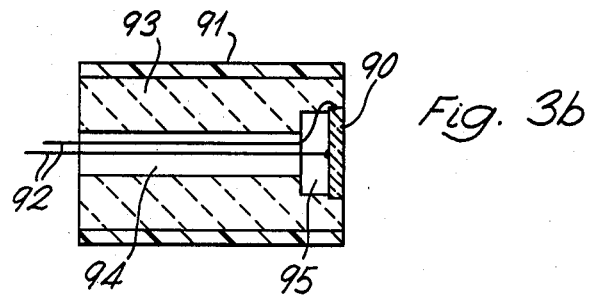
FIG. 3b is a schematic cross-section of a piezoelectric transducer which may be used in the apparatus of FIG. 3a, FIG. 4 is a block circuit diagram of a first E.D.M. efficiency meter.

The transducer 130 includes a disc 90 (see FIG. 3b) made from a piezoelectric ceramic, the disc being positioned in an insulating tube 91. The disc is 2 mm thick and 9 mm in diameter and consists of a modified lead zirconate titanate ceramic PZT-4, available from Verritron Limited, Thornhill, Southampton, England. Electrical connections 92 are made to the disc and the tube 91 is filled with an insulating material 93 such as an epoxy resin but a bore 94 with an enlarged portion 95 is provided. This transducer can be used from 10 Hz to 2 MHz and a slightly thinner disc is required for higher frequencies. The whole transducer is placed in a thin plastic envelope (not shown) particularly when it is to be used in the dielectric liquid. Electrical shielding may also be provided in the form of a copper tube around the tube 91, the copper tube being suitably earthed according to known shielding techniques.

The transducer can be positioned anywhere in the dielectric liquid 13 (but not of course in gap 25), for example strapped to the workpiece 10 or the electrode 11, or it may be positioned outside the tank 12 preferably in contact therewith, or otherwise in the vicinity of the tank.

A commercially available hydrophone such as the Type 8103 miniature hydrophone available from Brüel and Kjaer, of Naerum, Near Copenhagen, Denmark, may be used in the nominal frequency range 0.1 Hz to 200 KHz, although this hydrophone can be used at higher frequencies, for example 1 MHz. Many other suitable hydrophones are of course available.

The amplifier 40' has a bandwidth covering the range 2 KHz to 70 KHz since the highest amplitude sound signal tends to move in this range as the duration of the voltage pulses applied to the gap change. The amplifier may include a variable frequency tuned stage to allow the highest amplitude signal to be followed under changing pulse conditions.

Other suitable transducers may be constructed using other piezoelectric crystals, ceramics or materials.

The amplifier is followed by a diode detector in the form of a series diode and a shunt connected capacitor with a series resistor is used. The amplifier has an output signal amplitude dependent on input signal amplitude and preferably has a linear gain characteristic. Any suitable milliammeter can be connected at the output of the detector.

By means of a gain control on the amplifier, the gain of the amplifier is set so that under best sparking conditions the pointer of the milliammeter takes up a position 33. A tuning control may also be provided and used in a similar way. It will then be found that arcing is indicated by the pointer taking up some such position as is indicated at 34, while open and short circuit conditions are indicated by the pointer being in position 5. A position where a reasonable amount of machining is taking place evenly is indicated by pointer position 36. Thus the operator adjusts the above machine controls for example: pulse duration, mark space ratio and electrode feed to keep the pointer as near position 3 as is possible.

In the other embodiments of the invention to be specifically described hereinafter and in general use of the invention, transducers and hydrophones may be as already described in connection with FIGS. 3a, and an amplifier followed by a detector as also described may be used.

Figure 4:
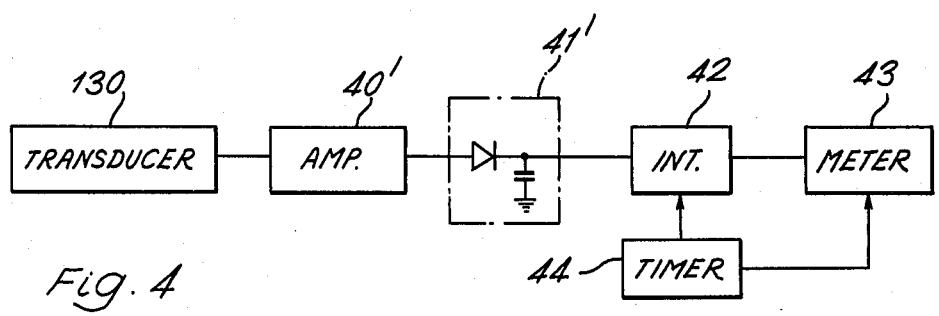

Another useful aid in E.D.M. machining is the efficiency indicator which will now be described. In FIG. 4 the transducer 130 is located in the region of the electrode or the workpiece and is coupled by way of the amplifier 40' to a detector 41' which may simply comprise the series diode and shunt capacitor shown. Again the amplifier 40 has an output signal amplitude dependent on input signal amplitude and preferably has a linear gain characteristic. The output of the detector is passed to an integrator 42 which integrates the d.c. signal corresponding to the envelope of the sound signal radiated from the gap. A meter 43 indicates the output of the integrator. A time 44 is provided to reset the integrator at manually selected intervals, for example in the range 2 to 20 minutes. Preferably the meter 43 includes a sample and hold circuit (not shown) which samples the integrator output immediately before it is reset.

In an alternative arrangement the integrator 42 is of the type which produces a digital output and this digital output is passed to a counter (neither the counter nor the digital display being shown). Again a sample and hold circuit is preferably used so that the display always shows the maximum count reached by the counter in the previous interval.

Figure 5:
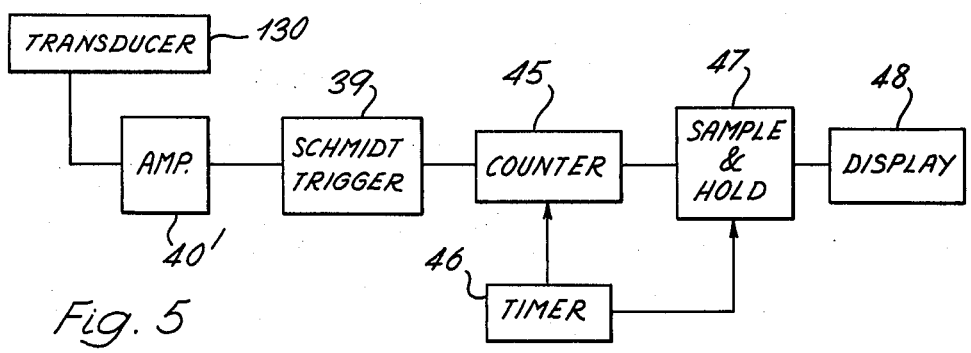
FIG. 5 is a block circuit diagram of a second E.D.M. efficiency meter.

Another form of E.D.M. efficiency meter is shown in FIG. 5 where as in FIG. 4 the transducer 130 is coupled to the amplifier 40'. A Schmidt trigger circuit 39 converts the signal from the amplifier 40' to rectangular pulses at a repetition frequency equal to the sound frequency. Its trigger level is set comparatively high so that it is triggered only by "efficient" sparking. The pulses produced are counted by a counter 45 which is reset at manually selectable intervals by a timer 46. Immediately before reset the counter output is sampled by a sample and hold circuit 47 and the number held by the sample and hold circuit is displayed by a display 48.

The efficiency meters described in FIGS. 4 and 5, in effect, give an output which shows the effective machining time in any interval selected using one of the timers.

If t is the total time of machining, $I_o$ is the highest amplitude of sound emission—corresponding to the best machining condition, and $I(t)$ is the sound emission at a comparatively high level which occurs during the sparking condition, then the efficiency of E.D.M. process =

$$\frac{\int_o^t I(t)dt}{\int_o^t I_o dt}$$

The numerator in the above expression is given by the meter 43 and the display 48 and the denominator is a constant partially dependent on the time selected by the timer between resetting the integrator 42. For comparisons to be made, this constant does not have to be known but the time selected is kept constant. Alternatively the denominator can be found by a calibration in which "perfect" sparking is achieved for the whole integration time.

Figure 6:
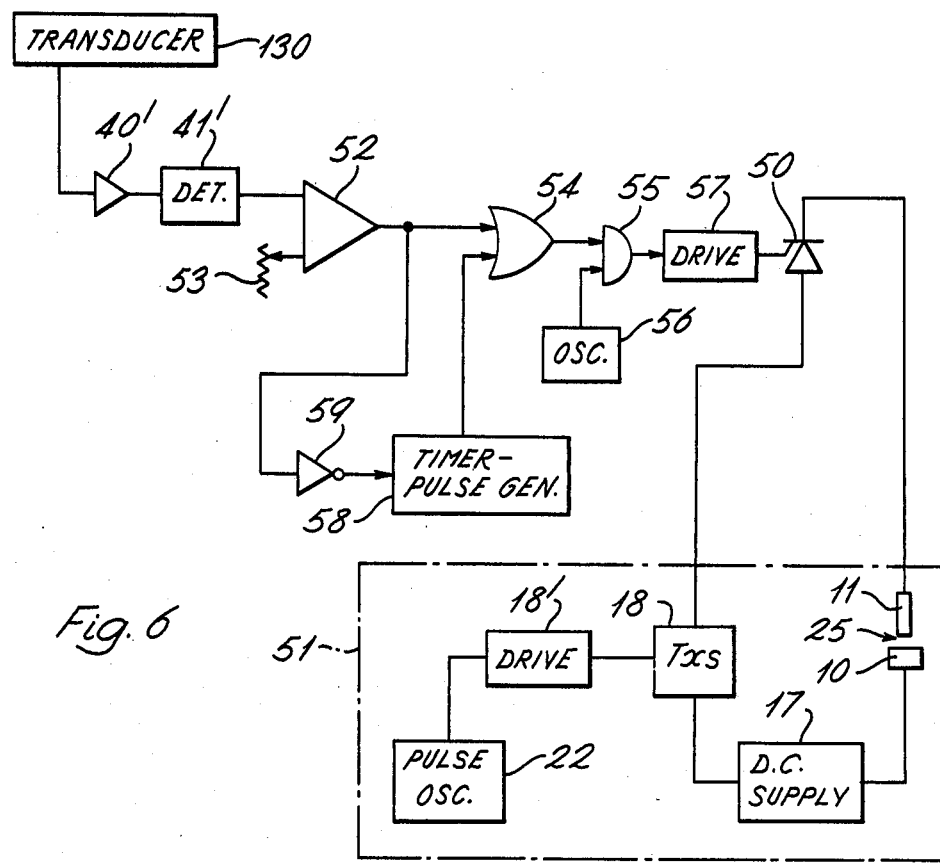
FIG. 6 is a block diagram showing how the E.D.M. machine of FIG. 1 can be modified in a first way according to the invention.

One way in which E.D.M. monitoring technique disclosed above can be used to control an existing machine is shown in FIG. 6.

A semiconductor rectifier (SCR) 50 is coupled in series with the d.c. supply 17 of FIG. 1, the group of transistors 18, the electrode 11 and the workpiece 10. As before the group of transistors 18 are rendered alternately conducting and nonconducting by pulses from the oscillator 22. Thus all the items of equipment inside the dashed line 51 are part of an existing E.D.M. machine such as the Sparcatron Generator SPF 60W. Some other parts of the machine are not shown and some of these parts are not in operation in the modified machine.

When sound radiation in the region of 2 KHz to 70 KHz is received by the transducer 130 amplified by the amplifier 40' and detected by the detector 41' the resulting unidirectional voltage (the monitor signal) is compared in a comparator 52 with an adjustable reference level derived from a potentiometer 53. If the level of the monitor signal is high enough to indicate that sparking is occurring in the gap 25 the comparator passes a signal to an OR gate 54 and then to an AND gate 55. Since an SCR is triggered most effectively by 10 microsecond duration pulses an oscillator 56 is provided which generates such pulses. Each pulse is followed by a 5 microsecond gap, so that the oscillation period is 15 microseconds. Hence when sparking occurs 10 microsecond pulses reach a drive circuit 57 and gate the SCR 50 into its conducting condition. When the sound signal received by the transducer 130 is low, for example during arcing or when it is practically non-existent during short or open circuits, the gate 55 remains closed and the SCR 50 is not triggered. The SCR 50 is gated to conduction again after an interval which is sufficient to allow any ionisation channel formed during arcing to disperse, and on start up, by start pulses generated by a timer/pulse generator 58 under the control of the comparator 52 by way of an inverter 59. Thus when the sound signal falls to a low level, the generator 58 generates a start pulse after a ten milliseconds interval and if the sound signal is at a low level start pulses are generated every ten milliseconds. Each start pulse causes a triggering pulse to be applied by the drive 57 to the SCR 50.

The timer/pulse generator 58 may be a monostable circuit triggered to its unstable state at the start of the ten millisecond interval and emitting a pulse at the end of that interval when it returns to its stable state.

In order to maintain the SCR 50 in the conducting state during the intervals between the pulses from the oscillator 22, the time constant of the detector 41 is long enough to maintain a signal at the output of the OR gate 54 during these intervals.

Figure 7A:
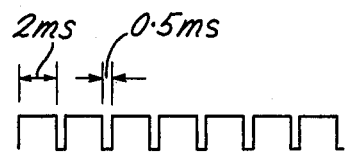
FIG. 7 shows waveforms useful in explaining the operation of the circuit of FIG. 6.
Figure 7B:
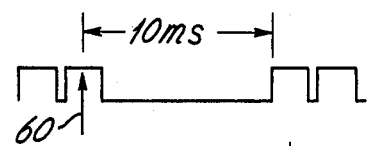
Figure 7C:
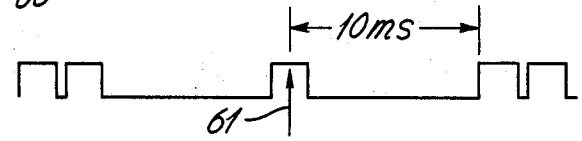

Some of the waveforms which occur in FIG. 6 are shown in FIGS. 7a to 7c. The waveform of FIG. 7a appears at the output of the group of transistors 18 and for example this waveform may be adjusted so that each pulse has a two millisecond second duration with a 0.5 millisecond gap between pulses. When the first start pulse from the oscillator 58 opens the gate 55 a series of 10 microsecond pulses passing through the gate 55 from the oscillator 56 fire the SCR 50 and for example the waveform of FIG. 7b appears across the gap 25. If in this example arcing commences at the point 60, comparator 52 indicates the sound signal has fallen to a low level, the AND gate 55 closes and the SCR 50 only continues to conduct until current ceases to be passed from the group 18 of transistors at the end of the then existing pulse. The inverter 59 triggers the pulse generator 58 so that after a period of 10 milliseconds a new start pulse is generated and the SCR 50 is again gated into conduction. It is during this period of 10 milliseconds that the ionisation channel of the arc disperses so that from then on sparking continues during pulses from the transistor group 18 without interruption as is shown by the continuing pulse train to the right of FIG. 7b. However arcing may start again at point 61 as shown in FIG. 7c when the pulses applied to the gap 25 are once more interrupted for a further 10 milliseconds. Should several cycles of this condition occur the drive 26 (see FIG. 1) comes into operation and the electrode 11 is withdrawn from the region of the workpiece so that the gap can be thoroughly flushed with paraffin and any swarf removed for example by using the flushing tube and solenoid valve mentioned above.

The pulse waveform of FIG. 7a can also be regarded as that appearing across the gap 25 when sparking occurs continuously during pulses and the SCR 50 is always gated into conduction at the beginning of a pulse from the transistor group 18.

In the circuit of FIG. 6 the amplifier 40 may be a type NE 592 r.f. amplifier, a type 710 comparator may be used for the comparator 52 and the oscillator 56 and pulse generator 58 may be type 555 timers.

Since pulse lengths can be adjusted from 2 $\mu$sec to 2 $\mu$sec it will be appreciated that whereas as shown in FIG. 7a the point 60 may occur at a position in a pulse which significantly reduces the nominal 10 msec for the ionisation channel to disperse; under most pulse length settings this reduction will not be particularly significant even when the point 60 occurs near the beginning of a pulse.

Whereas in FIG. 1 the group 18 of transistors forms only a proportion of the transistors connected in series with the supply 17 and the gap 25, transistors of both groups 18 and 19 may be controlled by the outputs of the AND gate 55 of FIG. 6. Similarly in the embodiments to be described either one group of transistors may conduct continuously or both groups may be controlled to conduct under specific conditions.

Figure 8:
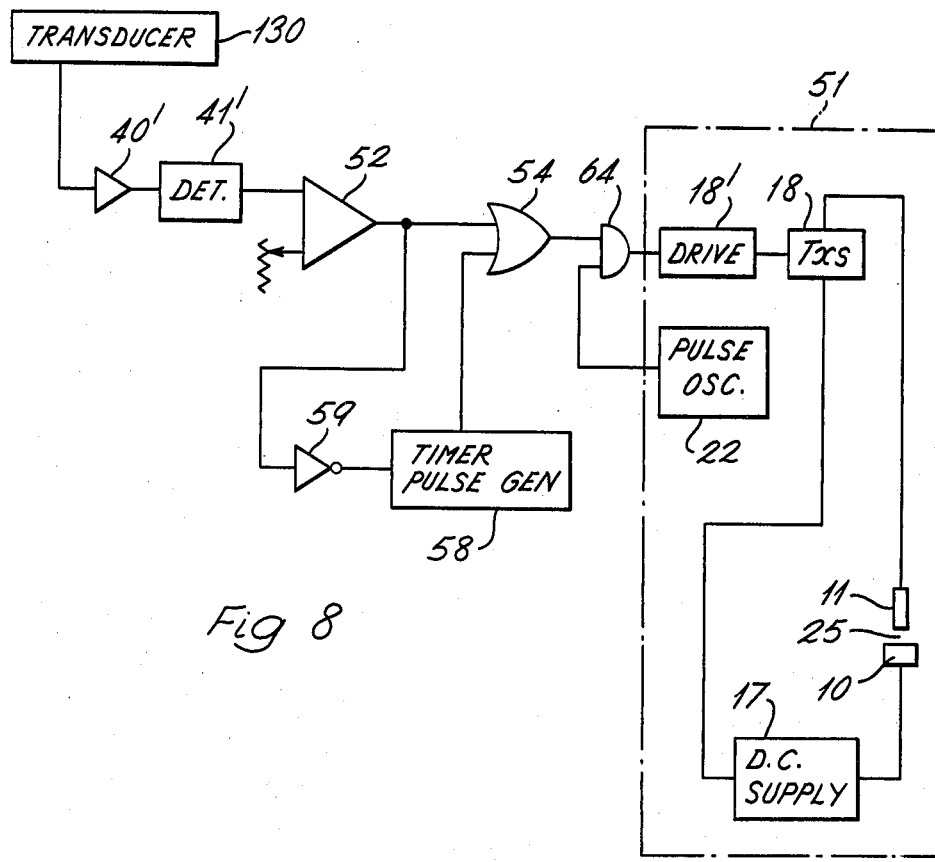
FIG. 8 is a block diagram of an arrangement in which the E.D.M. machine of FIG. 1 is modified in a second way according to the invention.

Another way in which the monitoring technique of the invention can be applied to an existing E.D.M. machine is indicated in FIG. 8 where components 130, 40', 41', 52, 54, 58 and 59 perform the same functions as in FIG. 7. As before the detector 41 has a time constant which allows the intervals between pulses from the oscillator 22 to be bridged. Again the dashed line 51 encloses components of a conventional E.D.M. machine. However in this case pulses are not produced at the output of the group 18 of transistors unless a sound signal indicating sparking is received or unless the oscillator 58 generates start pulses. The oscillator 22 is connected to an AND gate 64 which also receives an input from the OR gate 54.

Figure 9A:
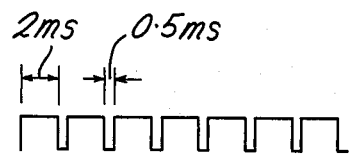
FIG. 9 shows waveforms useful in explaining the operation of FIG. 8.
Figure 9B:
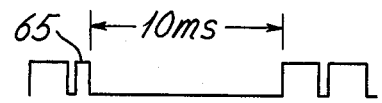
Figure 9C:
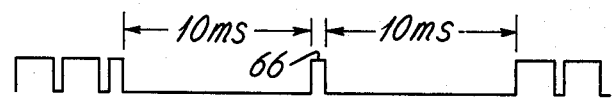

In FIG. 9a pulses appearing across the gap 25 under good sparking conditions in the arrangement of FIG. 8 are shown but in FIG. 9b an arc occurs at point 65 whereupon the AND gate 64 closes and the group 18 of transistors ceases to conduct immediately the time constant of the detector 41 allows. There is then a 10 millisecond interval controlled by the start pulse oscillator 58 to allow any ionisation channel to subside before the AND gate 64 is again opened. The advantage of this arrangement is that whereas in FIG. 6 the power transistors were switched "on" even if the SCR 50 was not conducting, in the arrangement of FIG. 8 it is the power transistors of the group 18 which are controlled. FIG. 9c is an example of waveform across the gap 25 when an arc restrikes at the point 66 during the first pulse after the first 10 millisecond interval. Again if several of these cycles occur the drive 26 clears the electrode 11 from the region of the workpiece and the gap is thoroughly flushed before the electrode 11 is driven back into position and machining starts again.

Figure 10:
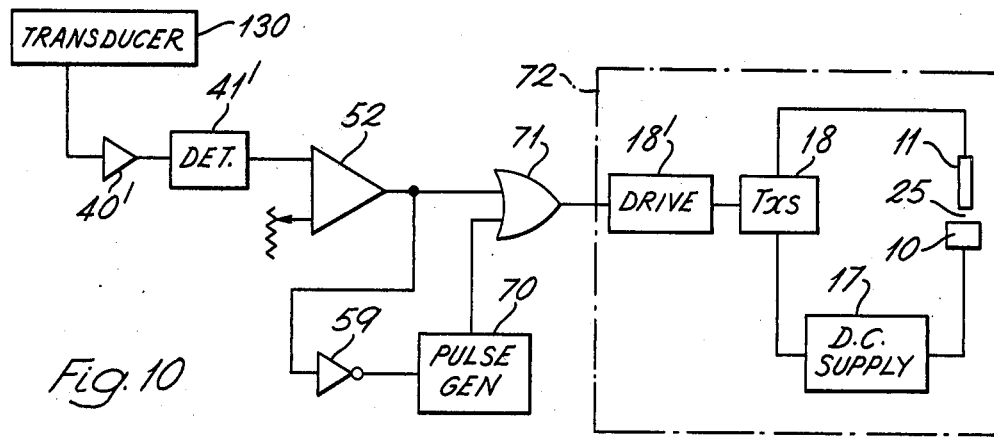
FIG. 10 is a block diagram of an E.D.M. machine according to the invention (or a modified E.D.M. machine of the type shown in FIG. 1)
Figure 11:
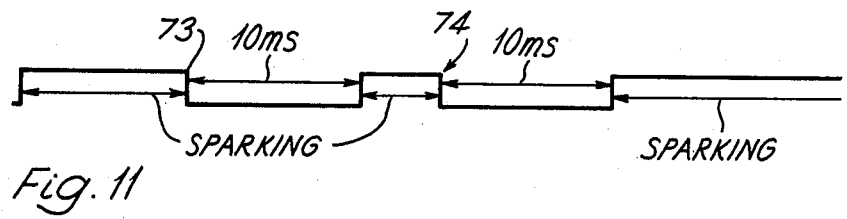
FIG. 11 is a waveform diagram useful in explaining the operation of FIG. 10.
Figure 12:
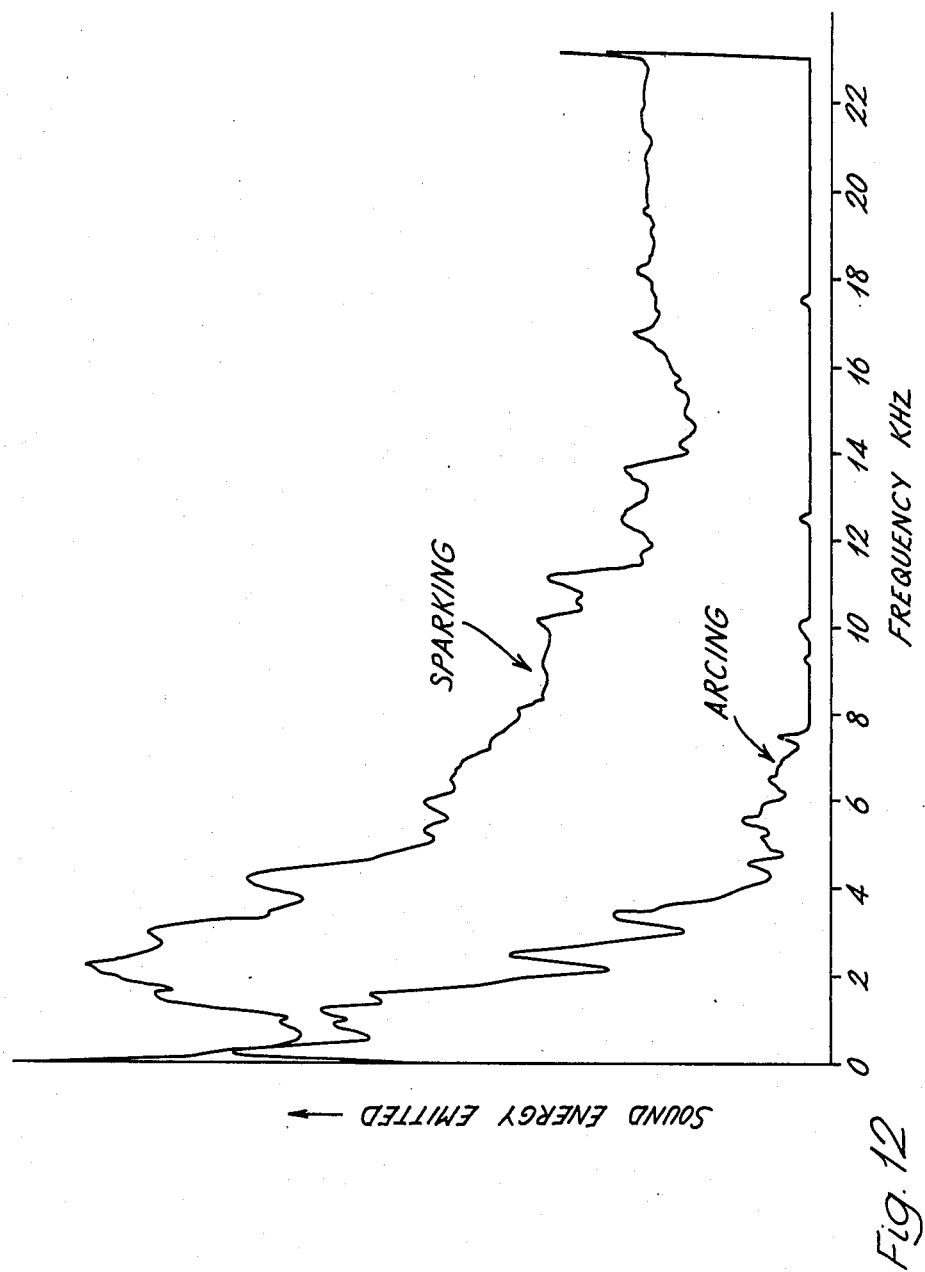
FIG. 12 shows examples of spectra (sound emission versus frequency) for sparking and arcing during machining.

Many of the same components from FIG. 6 and 8 are used again in the arrangement of FIG. 10. At the beginning of machining, but after a ten millisecond interval, a low level sound signal causes the comparator 52 to trigger a pulse generator 70 to provide a pulse, which reaches the drive circuit 18' by way of an OR gate 71 and causes the transistor group 18 to conduct. Thus if conditions are correct for sparking sound radiation at a high level commences and a signal from the comparator 52 maintains a signal causing the transistors of the group 18 to continue conduction. Sparking continues in the gap until for example an arc occurs at point 73 in FIG. 11 when the signal from the comparator ceases and the transistor group 18 immediately ceases to conduct. The waveform of FIG. 11 falls to zero and a ten millisecond interval ensues for the arc ionisation channel to disperse, the start of this interval being triggered by the comparator 52 by way of the inverter 59 and ending when the pulse generator 70 applies a start pulse to the OR gate 71. This process is continuous as indicated in FIG. 11 where a further arc occurring at point 74 is also shown. Clearly the advantage of the arrangement of FIG. 10 is that very high machining efficiency can be obtained since there are no interruptions in sparking until arcs occur and then the interruptions are just sufficiently long for ionisation channels to disperse. The waveform shown in FIG. 11 is by way of illustration and in fact, of course, sparking would occur for a much greater portion of any machining time. Again provision is made for flushing the gap if arcing cycles of short period occur continually.

Coarse and fine machining used at the beginning and end of a machining operation are often controlled by using long drive pulses to start and short pulses at the end. This adjustment is not available in the arrangement of FIG. 10, since drive is applied at all times in which sparking occurs. However coarse and fine machining is achieved by adjustment of the power applied to the gap, for example by controlling the number of transistors in operation in the group 18.

The arrangement of FIG. 10 can be further modified by replacing the d.c. supply 17 and the groups of transistors 18 and 19 by an SCR bridge (not shown) with an a.c. supply connected across two terminals and the electrode and workpiece connected across opposite terminals. The four SCRs of the bridge are then directly triggered by the output from the gate 71 by way of a drive circuit but of course only those correctly poled by the supply at that time conduct. The SCRs can be replaced by SCSs with the advantage that arcing can be made to cease directly it is detected by switching off those SCSs which are conducting.

Whereas in the specific examples given above the control, derived from sound monitoring, controls the voltage waveform across the gap between the electrode and the workpiece it can of course also or alternatively be used to control other parameters of machining, notably the speed of feed of the electrode 11 towards the workpiece 10 as achieved by the drive 26. For example a logic circuit may be provided to control the feed rate, the logic circuit making adjustment when cycles ending with arcing occur at a frequency which is considered too high. Conversely if sparking is found to be continuous then the feed rate is increased until the point where arcing begins to occur occasionally. The adaptive control operated by the monitoring of the invention can be used to control pulse length and mark space ratio, gap opening and gap flushing, and gap current. It will be apparent to those skilled in the art how these parameters should be adjusted and how logic circuits for that adjustment can be designed.

Both sound and optical radiation may be used to monitor the purity of the dielectric liquid by positioning a source of radiation and a receiver so that radiation has to pass through the liquid to reach the receiver from the source. The output of the receiver may then be applied to the microprocessor as one of the signals to be taken into account in controlling the E.D.M. machine.

It will be appreciated that while specific embodiments of the invention have been described the invention can be put into practice in many other ways and other sensors such as a microphone or vibration detector can be used. In particular the specific embodiments may be adapted to receive sound signals at other frequencies in the range 1 KHz to 2 MHz, the main steps required being design of transducer and of the amplifier 40'. It will also be apparent that the various specific embodiments may also put the invention into practice when modified in many ways, for instance by using different circuits.

We claim:

1. A method of electrical discharge machining characterized by receiving energy transmitted by the vibration of particles and emitted from the vicinity of the gap between an electrode and a workpiece when the electrode is being used to machine the workpiece, the energy having a characteristic which differs in some way or ways between first and second electrical discharge-conditions, and deriving a monitoring signal representative of the said characteristic from the energy received.

2. A method of electrical discharge machining according to claim 1 wherein at least one parameter of the machining process is varied automatically in accordance with said monitoring signal.

3. A method of electrical discharge machining according to claim 1 characterized in that first and second operations are repeatedly carried out, the first operation being the application of a voltage between the electrode and the workpiece to provide sparking in the gap, and the second operation, commencing when the monitoring signal indicates the cessation of sparking, being the removal of the said voltage for a time at least sufficient to allow de-ionisation in the gap.

4. Apparatus for electrical discharge machining including
means for applying voltage between an electrode and a workpiece in order to machine the workpiece, the electrode and the workpiece being separated by a gap during machining, and
monitoring means comprising
a receiver for energy transmitted by the vibration of particles and emitted from the vicinity of the gap during machining, the energy having a characteristic which differs in at least one way between first and second electrical-discharge conditions, and
indicator means connected to receive signals from the said receiver and constructed to derive, from the signals so received, a monitor signal representative of the said characteristic.

5. Apparatus according to claim 4 wherein
the first and second conditions are arcing and sparking, respectively,
the receiver is constructed to respond to vibrations in the frequency range 1 KHz to 2 MHz, and
the indicator means is constructed to derive a monitor signal representative of the degree of sparking in the said gap.

6. Apparatus according to claim 5 wherein
the receiver is constructed to respond substantially only to vibrations in the frequency range 2 KHz to 70 KHz.

7. Apparatus according to claim 6 wherein the receiver comprises a transducer, an amplifier having a bandwidth covering the range 2 KHz to 70 KHz, the amplifier input being coupled to the transducer input, and a detector coupled at the output of the amplifier.

8. Apparatus according to claim 7 wherein the detector output is coupled to an integrating circuit with output coupled to a display, means being provided for periodically resetting the integrating circuit and the display.

9. Apparatus according to claim 4 including
control means for the means for applying voltage between the electrode and the workpiece, the control means being arranged to cause the application of the said voltage to be interrupted following a change in the said characteristic which indicates a change in an electrical discharge between the electrode and workpiece from sparking to arcing.

10. Apparatus according to claim 9 wherein the means for applying voltage between the electrode and the workpiece is constructed to apply a series of voltage pulses at a predetermined repetition frequency, and each interruption is a cessation of pulses for a predetermined interval after which pulses continue at the said repetition frequency.

11. Apparatus according to claim 10 wherein the means for applying voltage between the electrode and the workpiece comprises at least one power switching device connected to be in series, in operation, with terminals for the connection of a direct current source, the said electrode and the said workpiece, and a pulse oscillator for applying pulses to trigger the power switching device into conduction periodically, and wherein the control means includes a control switching device connected in series with the power switching device, the said terminals and, in operation, the gap between the electrode and the workpiece, first means for periodically triggering the control switching device when the monitoring signal is above a predetermined level, and second means for triggering the control switching device at predetermined intervals when the monitor signal is below the predetermined level, the intervals between triggering by the second triggering means being sufficient for an ionisation channel in the gap to disperse.

12. Apparatus machine according to claim 11 wherein the control switching device is a thyristor, the first means comprises a further pulse oscillator constructed to generate pulses of suitable shape and duration for triggering the thyristor, a gate being provided between the further oscillator and the thyristor which, in operation, is enabled by triggering signals from either the first or second triggering means.

13. Apparatus according to claim 10 wherein the means for applying voltage between the electrode and workpiece comprises at least one power switching device connected to be in series, in operation, with terminals for the connection of a direct current source, the said electrode and the said workpiece, and a pulse oscillator for applying pulses to trigger the power switching device into conduction periodically, and wherein the control means comprises a gate coupled between the pulse oscillator and the power switching device, first means for enabling the gate when the monitor signal is above a predetermined level, and second means for enabling the gate at predetermined intervals, sufficient for an ionisation channel in the gap to disperse, when the monitoring signal is below the predetermined level.

14. Apparatus according to claim 4 comprising a tank for dielectric fluid containing support means for supporting the workpiece, a holder for the electrode, means for controlling the relative positions of the said electrode and the said workpiece to allow E.D.M. to take place, and control means for adapting at least one parameter of the machining process carried out by the machining apparatus, in accordance with the monitoring signal.

15. An E.D.M. machine according to claim 14, wherein the supply means comprises means for supplying voltage or current pulses to the gap between the said electrode and the said workpiece, the control means includes means for adjusting the duration of the pulses, and/or the mark space ratio of the pulses in accordance with the monitoring signals, or for curtailing the generation of pulses when the level of the monitor signal falls below a predetermined level.

16. Apparatus according to claim 14, wherein the means for applying voltage between the electrode and the workpiece comprises pulses to the gap between the said electrode and the said workpiece, and the control means includes means for interrupting the currently occurring pulse and the generation of pulses following a fall in the level of the monitoring signal below a predetermined limit.

17. Apparatus according to claim 14, wherein the control means includes means for repeatedly causing first and second operations to be carried out, the first operation being the substantially continuous application by the said voltage applying means of a voltage between the electrode and the workpiece to provide sparking in the gap, and the second operation, commencing when the monitoring signal indicates the cessation of sparking, being the removal of the said voltage for a time at least sufficient to allow at least some de-ionisation in gap.

18. Apparatus according to claim 17 wherein said voltage applying means includes a d.c. supply connected, in operation, by way of switching means across the gap, and the control means comprises a comparator for providing a first control signal when the monitoring signal is above a predetermined level, a pulse generator which in operation, is triggered by the absence of the first control signal to generate a second control signal after a predetermined interval at least sufficient to allow de-ionisation in the gap, and OR-gate means connected to receive the first and second control signals as inputs and to cause the switching means to conduct only when the first or the second control signals are present.

19. Apparatus according to claim 14 wherein the control means is constructed to adapt at least one of the following:
 size of gap between electrode and workpiece, rate of feed of electrode towards workpiece (or vice versa),
 voltage and/or current across the gap, initiation of scavenging the gap by pumping dielectric liquid through the gap, and scavenging by greatly increasing the size of the gap.

20. Apparatus according to claim 13 wherein the control means includes
 comparator for comparing the monitoring signal with an adjustable reference signal, and the means for applying voltage between the electrode and workpiece includes at least one switching device connected in series with terminals for a d.c. supply and in operation, the said electrode and the said workpiece, the switching device being connected to be triggered to conduct when the comparator output indicates that the monitor signal is above the reference level, and timing means for generating triggering pulses at predetermined intervals for the switching device or devices when the comparator indicates that the level of the monitoring signal is below that of the reference signal, the predetermined interval being sufficient for an ionisation channel in the gap to disperse.

21. Apparatus according to claim 14, wherein the means for applying voltage between the electrode and the workpiece applies pulses to the gap between the said electrode and the said workpiece, and the control means includes means for adjusting at least one of the following: the duration of the pulses and the mark space ratio of the pulses in accordance with the monitoring signals.

22. Apparatus according to claim 14, wherein the means for applying voltage between the electrode and the workpiece applies pulses to the gap between the said electrode and the said workpiece, and the control means includes means for curtailing the generation of pulses when the level of the monitor signal falls below a predetermined level.

23. Apparatus for controlling a machine for carrying out electrical machining, the apparatus comprising
 monitoring means having a receiver for energy transmitted by the vibration of particles and emitted from the vicinity of the gap between an electrode and a workpiece when the electrode is being used to machine the workpiece, the energy having a frequency content which differs between sparking and arcing in the said gap,
 indicator means for providing a monitor signal representative of the frequency content of output signals from the receiver, and
 control means constructed to modify at least one aspect of the machining process carried out by the electrical discharge machine, in accordance with the monitoring signal obtained from the monitoring means.

* * * * *